US012606668B2

(12) United States Patent
Hwang et al.

(10) Patent No.: US 12,606,668 B2
(45) Date of Patent: \*Apr. 21, 2026

(54) POLYESTER RESIN BLEND

(71) Applicant: SK CHEMICALS CO., LTD., Gyeonggi-do (KR)

(72) Inventors: Da-Young Hwang, Gyeonggi-do (KR); Yoo Jin Lee, Gyeonggi-do (KR)

(73) Assignee: SK Chemicals CO., Ltd., Gyeonggi-do (KR)

( * ) Notice: Subject to any disclaimer, the term of this patent is extended or adjusted under 35 U.S.C. 154(b) by 596 days.

This patent is subject to a terminal disclaimer.

(21) Appl. No.: 17/613,813

(22) PCT Filed: May 28, 2020

(86) PCT No.: PCT/KR2020/006918

§ 371 (c)(1),
(2) Date: Nov. 23, 2021

(87) PCT Pub. No.: WO2021/010591

PCT Pub. Date: Jan. 21, 2021

(65) Prior Publication Data

US 2022/0227922 A1      Jul. 21, 2022

(30) Foreign Application Priority Data

Jul. 18, 2019      (KR) ........................ 10-2019-0086936

(51) Int. Cl.
*C08G 63/183* (2006.01)
*C08L 67/02* (2006.01)

(52) U.S. Cl.
CPC ............ *C08G 63/183* (2013.01); *C08L 67/02* (2013.01); *C08G 2250/00* (2013.01); *C08L 2205/025* (2013.01); *C08L 2205/24* (2013.01); *C08L 2207/20* (2013.01)

(58) Field of Classification Search
CPC ....... C08G 53/183; C08L 67/00; C08L 67/02; C08L 2205/025
See application file for complete search history.

(56) References Cited

U.S. PATENT DOCUMENTS

| | | |
|---|---|---|
| 6,140,422 A | 10/2000 | Khanarian et al. |
| 6,359,070 B1 | 3/2002 | Khanarian et al. |
| 2009/0181196 A1 | 7/2009 | Pecorini et al. |
| 2011/0015348 A1 | 1/2011 | Hwang et al. |
| 2011/0071235 A1 | 3/2011 | Kannan et al. |
| 2011/0091705 A1 | 4/2011 | Shih et al. |
| 2012/0157636 A1 | 6/2012 | Neill et al. |

| | | |
|---|---|---|
| 2013/0029068 A1 | 1/2013 | Treece et al. |
| 2014/0010982 A1 | 1/2014 | Neill et al. |
| 2014/0238585 A1 | 8/2014 | Shih et al. |
| 2014/0316037 A1 | 10/2014 | Kannan et al. |
| 2017/0233525 A1 | 8/2017 | Kulkarni et al. |
| 2018/0009937 A1 | 1/2018 | Shih et al. |
| 2020/0087450 A1 | 3/2020 | Lee et al. |
| 2020/0172662 A1 | 6/2020 | Lee et al. |
| 2022/0380529 A1 | 12/2022 | Lee et al. |

FOREIGN PATENT DOCUMENTS

| | | |
|---|---|---|
| CN | 102597051 | 7/2012 |
| EP | 3912815 | 11/2021 |
| JP | H11-323107 | 11/1999 |
| JP | 2002-512289 | 4/2002 |
| JP | WO 2006/062075 | 6/2008 |
| JP | 2010-065348 | 3/2010 |
| JP | 2011-511102 | 4/2011 |
| JP | 4771204 | 9/2011 |
| JP | 2012-126821 | 7/2012 |
| JP | 5664201 | 2/2015 |
| JP | 5801856 | 10/2015 |
| JP | 2017-170902 | 9/2017 |
| JP | 2018-62673 | 4/2018 |
| JP | 2018-076427 | 5/2018 |
| JP | 7431862 | 2/2024 |
| KR | 10-2008-0056470 | 6/2008 |
| KR | 10-2009-0077219 | 7/2009 |
| KR | 10-2009-0106548 | 10/2009 |
| KR | 10-2012-0114507 | 10/2012 |
| KR | 10-2013-0044867 | 5/2013 |
| KR | 10-2014-0063636 | 5/2014 |
| KR | 10-2015-0038014 | 4/2015 |
| KR | 10-2015-0066384 | 6/2015 |
| KR | 10-2017-0076558 | 7/2017 |
| KR | 10-2017-0083421 | 7/2017 |

(Continued)

OTHER PUBLICATIONS

Polyclear Splash 3301 data sheet https://www.ulprospector.com/plastics/en/datasheet/371907/polyclear-splash-pet-3301 (Year: 2025).*
Extended Search Report for European Patent Application No. 20840408.7, dated Jun. 16, 2023, 6 pages.
International Search Report and Written Opinion for International (PCT) Patent Application No. PCT/KR2020/006918, dated Sep. 10, 2020, 7 pages.

(Continued)

*Primary Examiner* — Jeffrey S Lenihan

(74) *Attorney, Agent, or Firm* — Sheridan Ross P.C.

(57) ABSTRACT

The present disclosure relates to a polyester resin blend. The polyester resin blend can provide a thick container with high transparency even if it contains recycled polyethylene terephthalate as well as virgin polyethylene terephthalate. In addition, the resin blend can be reused by itself, and is expected to be useful for providing continuously usable plastics that have been recently attracting attention.

13 Claims, No Drawings

(56)          References Cited

FOREIGN PATENT DOCUMENTS

TW          201906893          2/2019
WO     WO 2006/062075          6/2006

OTHER PUBLICATIONS

English Translation of the International Search Report for Interna-
tional (PCT) Patent Application No. PCT/KR2020/006918, dated
Sep. 10, 2020, 2 pages.

* cited by examiner

POLYESTER RESIN BLEND

CROSS REFERENCE TO RELATED APPLICATIONS

This application is a national stage application under 35 U.S.C. 371 and claims the benefit of PCT Application No. PCT/KR2020/006918 having an international filing date of 28 May 2020, which designated the United States, and which PCT application claimed the benefit of South Korea Patent Application No. 10-2019-0086936 filed 18 Jul. 2019, the contents of each of which are incorporated herein by reference in their entireties.

TECHNICAL FIELD

The present disclosure relates to a polyester resin blend.

BACKGROUND OF ART

Waste plastics, which account for about 70% of marine pollution, have recently emerged as a serious social problem, and each country regulates the use of disposable plastics while promoting reuse of waste plastics. Currently, waste plastics are collected, crushed and washed, and then melt-extruded and re-pelletized to be reused as raw materials. However, it is very difficult to provide good-quality plastic products due to foreign substances in the waste plastics. Accordingly, research on producing good-quality plastic products from waste plastics is urgently needed.

PRIOR ART DOCUMENTS

Patent Documents

Japanese Patent No. 4771204

DETAILED DESCRIPTION OF THE INVENTION

Technical Problem

The present disclosure is to provide a reusable polyester resin blend capable of providing a thick container with high transparency.

Technical Solution

In the present disclosure, there is provided a polyester resin blend including polyethylene terephthalate; and a polyester resin having a structure in which an acid moiety derived from a dicarboxylic acid or a derivative thereof and a diol moiety derived from a diol are repeated by polymerizing a dicarboxylic acid or a derivative thereof and a diol containing ethylene glycol and a comonomer, wherein the polyester resin includes 5 to 20 mol % of a diol moiety derived from a comonomer with respect to the total diol moiety derived from a diol, and the comonomer comprises isosorbide.

Advantageous Effects

The polyester resin blend according to an embodiment of the present disclosure can provide a thick container with high transparency even if it contains recycled polyethylene terephthalate as well as virgin polyethylene terephthalate. In addition, the resin blend can be reused by itself, and is expected to be useful for providing continuously usable plastics that have been recently attracting attention.

DETAILED DESCRIPTION OF THE EMBODIMENTS

Hereinafter, the polyester resin blend according to a specific embodiment of the present disclosure will be described.

The terminology used herein is for the purpose of describing particular embodiments only and is not intended to be limiting of the invention. The singular forms are intended to include the plural forms as well, unless the context clearly indicates otherwise. The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

According to an embodiment of the present disclosure, there is provided a polyester resin blend including polyethylene terephthalate; and a polyester resin having a structure in which an acid moiety derived from a dicarboxylic acid or a derivative thereof and a diol moiety derived from a diol are repeated by polymerizing a dicarboxylic acid or a derivative thereof and a diol containing ethylene glycol and a comonomer, wherein the polyester resin includes 5 to 20 mol % of a diol moiety derived from a comonomer with respect to the total diol moiety derived from a diol, and the comonomer comprises isosorbide.

The polyethylene terephthalate is widely used commercially due to its low price and excellent physical/chemical properties, but it has high crystallinity.

Therefore, it requires a high temperature during processing, and has a limitation in providing a transparent product due to its high crystallization rate.

The present inventors have researched to solve this problem, and found that blending polyester terephthalate with a polyester resin containing a diol moiety derived from a comonomer including isosorbide can provide a reusable polyester resin blend capable of providing a thick container with high transparency.

Hereinafter, the polyester resin blend will be described in detail.

The polyester resin according to the embodiment may be blended with various general-purpose polyethylene terephthalates to control its crystallinity and crystallization rate to an appropriate level, thereby providing a thick container with high transparency.

Accordingly, the type of the polyethylene terephthalate is not particularly limited. For example, the polyethylene terephthalate is prepared by polymerizing a dicarboxylic acid or a derivative thereof and a diol, and the dicarboxylic acid or a derivative thereof may be mainly terephthalic acid or a derivative thereof and the diol may be mainly ethylene glycol.

As used herein, the term 'dicarboxylic acid or a derivative thereof' means at least one compound selected from a dicarboxylic acid and derivatives of the dicarboxylic acid. In addition, the term 'derivative of the dicarboxylic acid' means an alkyl ester of dicarboxylic acid (C1 to C4 lower alkyl ester such as monomethyl ester, monoethyl ester, dimethyl ester, diethyl ester, dibutyl ester, or the like) or a dicarboxylic acid anhydride. Accordingly, for example, the terephthalic acid or the derivative thereof commonly includes a compound that reacts with a diol to form a terephthaloyl moiety, such as terephthalic acid; monoalkyl or dialkyl terephthalate; and terephthalic acid anhydride.

The polyethylene terephthalate may include a residue derived from a comonomer other than terephthalic acid or a derivative thereof. Specifically, the comonomer may be at least one selected from the group consisting of a C8-C14 aromatic dicarboxylic acid or a derivative thereof, and a C4-C12 aliphatic dicarboxylic acid or a derivative thereof. Examples of the C8-C14 aromatic dicarboxylic acid or the derivative thereof may include aromatic dicarboxylic acids or derivatives thereof that are generally used in manufacture of the polyester resin, for example, naphthalene dicarboxylic acid such as isophthalic acid, dimethyl isophthalate, phthalic acid, dimethyl phthalate, phthalic acid anhydride, 2,6-naphthalene dicarboxylic acid, etc., dialkylnaphthalene dicarboxylate such as dimethyl 2,6-naphthalene dicarboxylate, etc., diphenyl dicarboxylic acid, etc. Examples of the C4-C12 aliphatic dicarboxylic acid or the derivative thereof may include linear, branched or cyclic aliphatic dicarboxylic acids or derivatives thereof that are generally used in manufacture of the polyester resin, for example, cyclohexane dicarboxylic acid such as 1,4-cyclohexane dicarboxylic acid, 1,3-cyclohexane dicarboxylic acid, etc., cyclohexane dicarboxylate such as dimethyl 1,4-cyclohexane dicarboxylate, dimethyl 1,3-cyclohexane dicarboxylate, etc., sebacic acid, succinic acid, isodecylsuccinic acid, maleic acid, maleic anhydride, fumaric acid, adipic acid, glutaric acid, azelaic acid, etc. The comonomer may be used in an amount of 0 to 50 mol %, 0 mol % to 30 mol %, 0 to 20 mol % or 0 to 10 mol % with respect to the total dicarboxylic acid or the derivative thereof.

The polyethylene terephthalate may include a residue derived from a comonomer other than ethylene glycol. Specifically, the comonomer may be a C8-C40, or C8-C33 aromatic diol, a C2-C20, or C2-C12 aliphatic diol, or a mixture thereof. Examples of the aromatic diol may include ethylene oxide and/or propylene oxide-added bisphenol A derivatives such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, or polyoxyethylene-(6)-2,2-bis(4-hydroxyphenyl)propane (polyoxyethylene-(n)-2,2-bis(4-hydroxyphenyl)propane, polyoxypropylene-(n)-2,2-bis(4-hydroxyphenyl)propane, or polyoxypropylene-(n)-polyoxyethylene-(n)-2,2-bis(4-hydroxyphenyl)propane, wherein n is the number of polyoxyethylene or polyoxypropylene units). Examples of the aliphatic diol may include linear, branched or cyclic aliphatic diols such as diethylene glycol, triethylene glycol, propanediol (1,2-propanediol, 1,3-propanediol, etc.), 1,4-butanediol, pentanediol, hexanediol (1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethyl cyclobutanediol, etc. The comonomer may be used in an amount of 0 to 50 mol %, 0 mol % to 30 mol %, 0 to 20 mol % or 0 to 10 mol % with respect to the total diol.

The polyester resin according to the above embodiment may not only supplement physical properties of virgin polyethylene terephthalate, but also supplement reduced physical properties of recycled polyethylene terephthalate to a very good level.

The recycled polyethylene terephthalate can be understood to include polyethylene terephthalate collected after use or all obtained therefrom. Specifically, the recycled polyethylene terephthalate may be obtained by separating the collected waste plastics according to a certain standard, pulverizing and washing them and then re-pelletizing them by melt extrusion, or may be obtained by depolymerizing the collected waste plastics to a monomer level and repolymerizing them. The recycled polyethylene terephthalate may be used after re-pelletization and crystallization, or after further polycondensation in a solid state after crystallization depending on a processing method.

The recycled polyethylene terephthalate repolymerized by depolymerizing waste plastics to a monomer level may exhibit good properties that are not easily distinguishable from virgin polyethylene terephthalate. However, recycled polyethylene terephthalate obtained by re-pelletization of waste plastics is less transparent than virgin polyethylene terephthalate and has a very fast crystallization rate, making it difficult to produce transparent containers having an appropriate thickness, even if the recycled polyethylene terephthalate is used alone or mixed with virgin polyethylene terephthalate. However, the polyester resin according to an embodiment exhibits excellent miscibility with the recycled polyethylene terephthalate, thereby providing a thick container with high transparency. In particular, the polyester resin according to an embodiment can provide a molded article having no flow-mark on the surface without other additives, because it is highly miscible with recycled polyethylene terephthalate.

Accordingly, virgin polyethylene terephthalate, recycled polyethylene terephthalate, or a mixture thereof may be used as the polyethylene terephthalate.

In particular, the polyester resin according to an embodiment may exhibit excellent processability with a resin having an intrinsic viscosity of 0.6 to 0.8 dl/g among the recycled polyethylene terephthalate.

In addition, the polyester resin according to the above embodiment may be useful for recycling of a resin containing 95 mol % or more of a residue derived from terephthalic acid and 95 mol % or more of a residue derived from ethylene glycol among the recycled polyethylene terephthalate. Since the resin may be a homopolymer made of terephthalic acid and ethylene glycol, the upper limits of the residue derived from terephthalic acid and the residue derived from ethylene glycol are 100 mol %. When the residue derived from terephthalic acid and the residue derived from ethylene glycol are less than 100 mol %, a residue derived from the comonomer described above may be included within 5 mol %. Specifically, a residue derived from isophthalic acid and/or a residue derived from cyclohexanedimethanol may be included within 5 mol %, respectively.

The polyester resin may be blended with recycled polyethylene terephthalate having a crystallization temperature of 130° C. to 160° C. to effectively control a crystallization rate of the recycled polyethylene terephthalate.

The polyester resin may be blended with recycled polyethylene terephthalate having a melting temperature of 250° C. or higher to provide a polyester resin blend having a melting temperature that is easy to process.

The polyester resin according to the embodiment may be a crystalline resin.

In particular, the polyester resin may be a resin having crystallinity such that it does not fuse with each other even when dried at a high temperature with the polyethylene terephthalate. Specifically, a passing rate may be 97 wt % or more, 98 wt % or more, or 99 wt % or more when the polyethylene terephthalate and the polyester resin are pelletized to be 80 pieces per 1 g each, dried at a temperature of 160° C. for 1 hour, and then passed through a sieve having a sieve size of 2.36 mm. The sieve size refers to the longest length of the hole.

As the polyester resin according to the embodiment has such crystallinity, the blend blended with polyethylene terephthalate can be reused, unlike the amorphous resin. Accordingly, when the polyester resin is used, not only the waste plastics can be reused, but also a reusable plastic product can be provided.

It is advantageous for the polyester resin to have high transparency to provide a highly transparent molded article by blending with polyethylene terephthalate. Specifically, the polyester resin may have a haze of 5% or less, 4.5% or less, 4% or less, 3.5% or less, 3% or less, 2.5% or less, or 2% or less, when measured for a 6 mm thick specimen according to ASTM D1003-97. As the haze is most preferably 0% in theory, the lower limit may be 0% or more.

The polyester resin may have a melting temperature of 210 to 245° C., 220 to 240° C. or 230 to 235° C. when measured after crystallization at 180° C. for 100 minutes, so that it can be blended with polyethylene terephthalate and processed at an appropriate temperature to provide a molded article having the characteristics described above.

The polyester resin may have a crystallization half-time of 7 to 95 minutes, 7 to 80 minutes, 7 to 70 minutes, 7 to 60 minutes, 10 to 95 minutes, 30 to 95 minutes, to 95 minutes, 10 to 80 minutes, 30 to 70 minutes, 30 to 60 minutes or 40 to 60 minutes, so that it can be blended with polyethylene terephthalate and processed at an appropriate temperature to provide a molded article having the characteristics described above.

The polyester resin is obtained by polymerizing a dicarboxylic acid or a derivative thereof and a diol, and has a structure in which an acid moiety derived from a dicarboxylic acid or a derivative thereof and a diol moiety derived from a diol are repeated. In the present disclosure, the acid moiety and the diol moiety refer to a residue remaining after the dicarboxylic acid or a derivative thereof and the diol are polymerized to remove hydrogen, hydroxyl or alkoxy groups from them.

In particular, the polyester resin includes a diol moiety derived from a diol containing ethylene glycol and a comonomer, and the diol moiety derived from the comonomer may be included in 5 to 20 mol % with respect to the total diol moiety. Further, the comonomer may exhibit the above-described properties as it includes isosorbide (1,4:3, 6-dianhydroglucitol).

When the diol moiety derived from the comonomer is less than 5 mol %, it is difficult to provide a transparent molded article because the high crystallization rate due to polyethylene terephthalate cannot be adjusted to an appropriate level. When the diol moiety derived from the comonomer exceeds 20 mol %, the polyester resin exhibits amorphousness and can be easily fused in a processing or molding process. In addition, miscibility with polyethylene terephthalate decreases, flow-marks may occur on the surface of the molded article, and the polyester resin blend cannot be reused.

The polyester resin may include 5 to 15 mol %, 7 to 15 mol %, 8 to 15 mol % 10 to 15 mol %, 9 to 12 mol % or 10 to 12 mol % of the diol moiety derived from the comonomer with respect to the total diol moiety in order to exhibit better miscibility with recycled polyethylene terephthalate.

The polyester resin essentially includes a diol moiety derived from isosorbide as a diol moiety derived from a comonomer, and this structure makes it possible to manufacture a thick container with high transparency by adjusting the crystallization rate of polyethylene terephthalate to an appropriate level. Further, the polyester resin can be reused even after being mixed with recycled polyethylene terephthalate to provide a plastic that can be used continuously. On the other hand, referring to Comparative Example 5, which will be described later, a polyester resin including a diol moiety derived from a comonomer other than isosorbide exhibits good miscibility with polyethylene terephthalate and shows good processability. However, the polyester resin cannot provide a transparent product because it cannot control the crystallization rate of polyethylene terephthalate to an appropriate level.

The polyester resin may include 0.1 to 15 mol %, in particular 0.1 to 10 mol %, 0.1 to 9 mol %, 1 to 10 mol %, or 1 to 9 mol % of a diol moiety derived from isosorbide with respect to the total diol moiety to maximize the properties described above.

Meanwhile, the comonomer other than ethylene glycol may further include cyclohexanedimethanol in addition to isosorbide. The cyclohexanedimethanol may be used in an amount of 0.1 to 15 mol % with respect to the total diol to provide the polyester resin having the above-described properties.

When isosorbide and cyclohexanedimethanol are used as comonomers, they may be used in a ratio of 1:2 to 5 mol, or 1:2 to 4 mol to ensure better physical properties.

The comonomer other than ethylene glycol may include a diol generally used in manufacture of the polyester resin in addition to the monomers described above. Specific examples of the diol may include diols listed that can be used in the above-described polyethylene terephthalate. However, it is advantageous for the comonomer other than ethylene glycol to be isosorbide or a combination of isosorbide and cyclohexanedimethanol to satisfy the physical properties described above. When the comonomer includes a diol other than isosorbide and cyclohexanedimethanol, its content may be 10 mol % or less, 5 mol % or less, or 2 mol % or less with respect to the total comonomer.

In the polyester resin, a dicarboxylic acid or a derivative thereof may be mainly terephthalic acid or a derivative thereof like polyethylene terephthalate described above, and the polyester resin may include a comonomer other than terephthalic acid or a derivative thereof. The type and content of the comonomer can be adjusted by referring to the type and content of the comonomer that can be used for the above-described polyethylene terephthalate.

Meanwhile, the polyester resin may be prepared including the steps of performing an esterification reaction or a transesterification reaction on the above-described dicarboxylic acid or a derivative thereof and the above-described diol; and performing a polycondensation reaction on a product obtained by the esterification or transesterification reaction.

A catalyst may be used in the esterification or transesterification reaction. Such catalyst may include methylates of sodium and magnesium; acetates, borates, fatty acids, or carbonates of Zn, Cd, Mn, Co, Ca, Ba and the like; metals such as Mg; and oxides of Pb, Zn, Sb, Ge and the like.

The esterification or transesterification reaction may be carried out in a batch, semi-continuous or continuous manner. Each raw material may be added separately, but it may preferably be added in a slurry form in which the dicarboxylic acid or the derivative thereof is mixed in the diol.

A polycondensation catalyst, a stabilizer, a coloring agent, a crystallizing agent, an antioxidant, a branching agent and the like may be added in the slurry before the esterification or transesterification reaction or in the product after completion of the reaction.

However, the input timing of the above-described additive is not limited thereto, and the above-described additive may be added at any time during the preparation of the polyester resin. As the polycondensation catalyst, at least one of conventional titanium, germanium, antimony, aluminum, tin-based compounds may be appropriately selected and used. Examples of the preferable titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide copolymer, titanium dioxide/zirconium dioxide copolymer, and the like. In addition, examples of the preferable germanium-based catalyst include germanium dioxide and a copolymer thereof. As the stabilizer, phosphorus-based compounds such as phosphoric acid, trimethyl phosphate, and triethyl phosphate may be generally used, and an added content thereof may be 10 to 200 ppm with respect to a weight of the final polymer (polyester resin) based on a phosphorus atom. When the content of the stabilizer is less than 10 ppm, the polyester resin may not be sufficiently stabilized and a color of the polyester resin may become yellow. When the content is more than 200 ppm, a polymer having a high degree of polymerization may not be obtained. Further, examples of the coloring agent to be added for improving a color of the polymer may include conventional cobalt-based coloring agents such as cobalt acetate, cobalt propionate, and the like. An added content thereof may be 1 to 200 ppm with respect to a weight of the final polymer (polyester resin) based on a cobalt atom. If necessary, anthraquinone-based compounds, perinone-based compounds, azo-based compounds, methine-based compounds, and the like may be used as an organic coloring agent, and commercially available products include toners such as Polysynthren Blue RLS (manufactured by Clarient) and Solvaperm Red BB (manufactured by Clarient). An added content of the organic coloring agent may be 0 to 50 ppm with respect to a weight of the final polymer. When the coloring agent is used in the content out of the above-described range, a yellow color of the polyester resin may not be sufficiently covered or physical properties may be reduced.

Examples of the crystallizing agent may include a crystal nucleating agent, an ultraviolet absorber, a polyolefin-based resin, a polyamide resin, and the like. Examples of the antioxidant may include a hindered phenolic antioxidant, a phosphite-based antioxidant, a thioether-based antioxidant, and a mixture thereof. The branching agent is a common branching agent having at least three functional groups, and examples thereof may include trimellitic anhydride, trimethylol propane, trimellitic acid, or a mixture thereof.

Moreover, the esterification reaction may be carried out at a temperature of 200 to 300° C. or 230 to 280° C., and under a pressure of 0 to 10.0 kgf/cm² (0 to 7355.6 mmHg), 0 to 5.0 kgf/cm² (0 to 3677.8 mmHg) or 0.1 to 3.0 kgf/cm² (73.6 to 2206.7 mmHg). And the transesterification reaction may be carried out at a temperature of 150 to 270° C. or 180 to 260° C., and under a pressure of 0 to 5.0 kgf/cm² (0 to 3677.8 mmHg) or 0.1 to 3.0 kgf/cm² (73.6 to 2206.7 mmHg). The pressures outside the parentheses refer to gauge pressures (expressed in kgf/cm²) and the pressures inside parentheses refer to absolute pressures (expressed in mmHg).

When the reaction temperature and pressure are out of the above range, physical properties of the polyester resin may be lowered. The reaction time (average residence time) is usually 1 to 24 hours, or 2 to 8 hours, and may vary depending on the reaction temperature, pressure, and molar ratio of the diol to the dicarboxylic acid or the derivative thereof used.

The product obtained by the esterification or transesterification reaction may be subjected to a polycondensation reaction to prepare a polyester resin having a high degree of polymerization. Generally, the polycondensation reaction may be carried out at a temperature of 150 to 300 IC, 200 to 290° C. or 260 to 290 IC, and under a reduced pressure of 400 to 0.01 mmHg, 100 to 0.05 mmHg, or 10 to 0.1 mmHg. Herein, the pressures refer to absolute pressures. The reduced pressure of 400 to 0.01 mmHg is for removing by-products of the polycondensation reaction such as glycol and unreacted materials such as isosorbide. Therefore, when the pressure is out of the above range, the removal of by-products and unreacted materials may be insufficient. In addition, when the temperature of the polycondensation reaction is out of the above range, physical properties of the polyester resin may be lowered. The polycondensation reaction may be carried out for the required time until the desired intrinsic viscosity is reached, for example, for an average residence time of 1 to 24 hours.

In order to reduce the content of the unreacted materials such as isosorbide remaining in the polyester resin, the unreacted raw materials may be discharged out of the system by intentionally maintaining the vacuum reaction for a long period of time at the end of the esterification reaction or the transesterification reaction or at the beginning of the polycondensation reaction, that is, in a state in which the viscosity of the resin is not sufficiently high. When the viscosity of the resin is high, it is difficult for the raw materials remaining in the reactor to flow out of the system. For example, the unreacted materials remaining in the polyester resin such as isosorbide may be removed effectively by leaving the reaction products obtained by the esterification or transesterification reaction before the polycondensation reaction for about 0.2 to 3 hours under a reduced pressure of about 400 to 1 mmHg or about 200 to 3 mmHg. Herein, a temperature of the product may be controlled to be equal to that of the esterification or transesterification reaction or that of the polycondensation reaction, or a temperature therebetween.

It is suitable that an intrinsic viscosity of the polymer obtained after the polycondensation reaction is 0.30 to 1.0 dl/g. When the intrinsic viscosity is less than 0.30 dl/g, a reaction rate of the solid-phase reaction may be significantly lowered. When the intrinsic viscosity exceeds 1.0 dl/g, a viscosity of a molten material may be increased during the melt polymerization, and thus a possibility of polymer discoloration may be increased by shear stress between a stirrer and the reactor, resulting in by-products such as acetaldehyde.

The polyester resin according to the embodiment may have a higher degree of polymerization by further performing a solid-phase reaction after the polycondensation reaction, if necessary.

Specifically, the polymer obtained by the polycondensation reaction is discharged out of the reactor to perform granulation. The granulation may be performed by a strand cutting method in which the polymer is extruded into a strand shape, solidified in a cooling liquid, and cut with a cutter, or an underwater cutting method in which a die hole is immersed in a cooling liquid, the polymer is directly extruded into the cooling liquid and cut with a cutter. In general, a temperature of the cooling liquid should be kept low in the strand cutting method to solidify the strand well, so that there is no problem in cutting. In the underwater cutting method, it is preferable to maintain the temperature of the cooling liquid in accordance with the polymer to make the shape of the polymer uniform. However, in the case of a crystalline polymer, the temperature of the cooling liquid may be intentionally kept high in order to induce crystallization during the discharge.

It is possible to remove raw materials soluble in water among unreacted raw materials such as isosorbide by water-washing the granulated polymer. The smaller the particle size, the wider the surface area relative to a weight of particles. Accordingly, it is advantageous that a particle size is small. In order to achieve this purpose, the particles may be made to have an average weight of about 15 mg or less. For example, the granulated polymer may be water-washed by leaving it in water at a temperature equal to the glass transition temperature of the polymer or lower than that by about 5 to 20° C. for 5 minutes to 10 hours.

The granulated polymer is subjected to a crystallization step to prevent fusion during the solid-phase reaction. The crystallization step may be performed under an atmosphere, inert gas, water vapor, or water vapor-containing inert gas or in solution, and may be performed at 110 to 210° C. or 120 to 210° C. When the temperature is low, a rate at which crystals of the particles are formed may be excessively slow. When the temperature is high, a rate at which a surface of the particles is melted may be faster than a rate at which the crystals are formed, so that the particles may adhere to each other to cause fusion. Since the heat resistance of the particles is increased as the particles are crystallized, it is also possible to crystallize the particles by dividing the crystallization into several steps and raising the temperature stepwise.

The solid-phase reaction may be performed under an inert gas atmosphere such as nitrogen, carbon dioxide, argon, and the like or under a reduced pressure of 400 to 0.01 mmHg and at a temperature of 180 to 220° C. for an average residence time of 1 to 150 hours. By performing the solid-phase reaction, the molecular weight may be additionally increased, and the raw materials that do not react in the melting reaction but just remain, and a cyclic oligomer, acetaldehyde, and the like that are generated during the reaction may be removed.

The solid-phase reaction may be performed until the intrinsic viscosity of the crystallized polymer reaches 0.65 dl/g or more, 0.70 dl/g or more, 0.75 dl/g or more, or 0.80 dl/g or more, wherein the intrinsic viscosity is measured at 35° C. after dissolving the polymer at a concentration of 1.2 g/dl in orthochlorophenol at 150° C. for 15 minutes.

Meanwhile, the polyester resin blend may provide a molded article having no flow-mark on the surface without special additives, even if it contains up to about 50 wt % of recycled polyethylene terephthalate as polyethylene terephthalate. Accordingly, the mixing ratio of the polyethylene terephthalate and the polyester resin in the polyester resin blend is not particularly limited.

For example, the polyester resin blend may include the polyethylene terephthalate and the polyester resin in a weight ratio of 1:99 to 99:1, 5:95 to 95:5, 10:90 to 90:10, 20:80 to 80:20, 30:70 to 70:30, 40:60 to 60:40 or 50:50.

Meanwhile, the polyester resin blend according to the embodiment may have a melting temperature of 225 to 250° C., 230 to 245° C., or 235 to 245° C. The polyester resin blend exhibits a melting temperature in the above-described range, even if it includes recycled polyethylene terephthalate, and thus can be reproduced as a molded article with excellent quality.

Meanwhile, the polyester resin blend may have a haze of 5% or less, 4.5% or less, 4% or less, 3.5% or less, 3% or less, 2.5% or less, 2% or less, or 1% or less when measured for a 6 mm thick specimen according to ASTM D1003-97, indicating high transparency. As the haze is most preferably 0% in theory, the lower limit may be 0% or more.

Even if the polyester resin blend according to the embodiment includes recycled polyethylene terephthalate, miscibility of the polyester resin with the recycled polyethylene terephthalate is excellent, and thus there is an advantage that no additive is required to supplement properties of the recycled polyethylene terephthalate. However, as a non-limiting example, the polyester resin blend may include an additive commonly applied in the art.

In addition, the polyester resin blend is capable of providing a thick container with high transparency even if it includes recycled polyethylene terephthalate as well as virgin polyethylene terephthalate. Further, the resin blend can be reused by itself, and thus is expected to be useful in providing a continuously usable plastic that has been recently attracting attention.

Hereinafter, action and effects of the present disclosure are described by specific Examples in more detail. Meanwhile, these Examples are provided by way of example, and therefore, should not be construed as limiting the scope of the present invention.

The following physical properties were measured according to the following methods.
(1) Intrinsic Viscosity (IV)

After dissolving a sample in o-chlorophenol at 150° C. for 15 minutes at a concentration of 1.2 g/dl, the intrinsic viscosity of the sample was measured using an Ubbelohde viscometer. Specifically, a temperature of the viscometer was maintained at 35° C., and the time taken (efflux time; to) for a solvent to pass between certain internal sections of the viscometer and the time taken (t) for a solution to pass the viscometer were measured. Subsequently, a specific viscosity was calculated by substituting to and t into Formula 1, and the intrinsic viscosity was calculated by substituting the calculated specific viscosity into Formula 2.

$$\eta_{sp} = \frac{t - t_0}{t_0} \qquad \text{[Formula 1]}$$

$$[\eta] = \frac{\sqrt{1 + 4A\eta_{sp}} - 1}{2Ac} \qquad \text{[Formula 2]}$$

In Formula 2, A was a Huggins constant of 0.247, and c was a concentration of 0.12 wt %.
(2) Melting Temperature after Crystallization (Tm)

After crystallizing the polyester resin at 180° C. for 100 minutes, the Tm of the crystallized sample was measured by differential scanning calorimetry (DSC). DSC 1 model manufactured by Mettler Toledo was used as a measuring device. Specifically, the crystallized sample was dried for 5 to 10 hours under a nitrogen atmosphere at 120° C. using a dehumidifying dryer (D2T manufactured by Moretto).

Therefore, the melting temperature was measured in a state in which a moisture content remaining in the sample was less than 500 ppm.

About 6 to 10 mg of the dried sample was taken, filled in an aluminum pan, maintained at a temperature of 30° C. for 3 minutes, heated at a rate of 10° C./min from 30° C. to 280° C., and maintained at a temperature of 280° C. for 3 minutes (1st scan). Then, the Tm peak value was analyzed in the first scan by DSC using an integration function in TA menu of the related program (STARe software) provided by Mettler Toledo. The temperature range of the first scan was set from onset point–10° C. to Tm peak+10° C., which was calculated by the program.

(3) Haze

A specimen having a thickness of 6 mm was prepared using a polyester resin or a polyester resin blend, and the haze of the specimen was measured using CM-3600A manufactured by Minolta according to ASTM D1003-97.

(4) Crystallization Half-Time

The crystallization half-time of the polyester resin was measured by differential scanning calorimetry (DSC). Specifically, after the polyester resin was completely melted, the temperature was maintained at a crystallized temperature, and the time (unit: minute) consumed to generate half of the total heat generated during crystallization was measured.

(5) Molecular Weight

The molecular weight of the polyester resin was measured by GPC (Gel Permeation Chromatography). Specifically, 0.03 g of a polyester resin was added to 3 mL of o-chlorophenol, and dissolved at 150° C. for 15 minutes. Then, 9 mL of chloroform was added thereto to prepare a sample, while cooling to room temperature. Then, two columns (Shodex LF804) were used to conduct gel permeation chromatography on the sample at a flow rate of 0.7 mL/min at a temperature of 40° C. The number average molecular weight (Mn) was calculated using polystyrene as a standard material.

(6) 2nd Melting Temperature

The second melting temperature of the polyester resin blend was measured by differential scanning calorimetry (DSC). DSC 1 model manufactured by Mettler Toledo was used as a measuring device. Specifically, the polyester resin blend was dried for 5 to 10 hours under a nitrogen atmosphere at 120° C. using a dehumidifying dryer (D2T manufactured by Moretto). Therefore, the melting temperature was measured in a state in which a moisture content remaining in the sample was less than 500 ppm.

About 6 to 10 mg of the dried sample was taken, filled in an aluminum pan, maintained at a temperature of 30° C. for 3 minutes, heated at a rate of 10° C./min from 30° C. to 280° C., and maintained at a temperature of 280° C. for 3 minutes (1st scan). After the first scan, the sample was rapidly cooled to room temperature, and then heated at a rate of 10° C./min from room temperature to 280° C. (2nd scan) to obtain a DSC curve. Then, the Tm peak value was analyzed in the second scan by DSC using an integration function in TA menu of the related program (STARe software) provided by Mettler Toledo. The temperature range of the second scan was set from onset point–10° C. to Tm peak+10° C., which was calculated by the program.

(7) Occurrence of Flow-Mark 36 g of preform was prepared by injection-molding a polyester resin blend. Thereafter, the preform was reheated to about 140° C., and then blow-molded to prepare a 500 mL bottle. During the blow molding, the temperature of the mold was adjusted to about 70° C. The prepared 500 mL bottle was visually observed to indicate 'O' when flow-mark was observed, and 'X' when not observed.

(8) Occurrence of Flake Fusion During Recycling

The bottle evaluated for the occurrence of flow-mark in (7) was pulverized to obtain flakes having a bulk density of about 250 to 600 g/L. The obtained flakes were left at 220° C. for 1 hour to visually observe whether or not the flakes were fused. When some fused parts were observed, it was indicated as 'O', and when not observed, it was indicated as 'X'.

(9) Loss Modulus Onset Point

The Young's modulus or storage modulus (E') and the loss modulus (E") of the polyester resin blend were measured by dynamic mechanical analysis (DMA), and the crystallization rate of the polyester resin blend was evaluated based thereon.

Specifically, the polyester resin blend was extruded into a sheet form, cut to a size of 30 mm×5.3 mm (longitudinal length×transverse length), and then E' and E" were measured under the following conditions using DMA. Then, the loss modulus onset point was determined as a point in time at which crystallization of the polyester resin blend began.

<Measuring Conditions>

Frequency fixed (Frequency sweep/Amplitude: 15 μm)

Temperature change: temperature increases at a rate of 3° C./min from room temperature up to 150° C.

When the loss modulus onset point is high, the polyester resin effectively slows down the high crystallization rate of recycled PET, which is advantageous for the production of a thick container with high transparency.

Preparation Example 1: Preparation of Polyester Resin 3257.4 g (19.6 mol) of terephthalic acid, 1423.4 g (23.0 mol) of ethylene glycol, and 229.2 g (1.6 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, and 0.7 g of cobalt acetate as a coloring agent were used. Then, nitrogen was injected into the reactor to form a pressurized state in which the pressure of the reactor was higher than normal pressure by 1.0 $kgf/cm^2$ (absolute pressure: 1495.6 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.55 dl/g. When the intrinsic viscosity of the mixture in the reactor reached a desired level, the mixture was discharged out of the reactor and stranded. This was solidified with a cooling liquid and granulated to have an average weight of about 12 to 14 mg.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.70 dl/g.

A content of a residue derived from isosorbide with respect to the total residue derived from a diol contained in the polyester resin was 5 mol %.

Preparation Example 2: Preparation of First Polyester Resin 3189.1 g (19.2 mol) of terephthalic acid, 1334.1 g (21.5 mol) of ethylene glycol, and 504.9 g (3.5 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, and 0.7 g of cobalt acetate as a coloring agent were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.50 dl/g. When the intrinsic viscosity of the mixture in the reactor reached a desired level, the mixture was discharged out of the reactor and stranded. This was solidified with a cooling liquid and granulated to have an average weight of about 12 to 14 mg. The particles thus obtained were stored in water at 70° C. for 5 hours to remove unreacted raw materials contained in the particles.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.95 dl/g.

A content of a residue derived from isosorbide with respect to the total residue derived from a diol contained in the polyester resin was 10 mol %.

Preparation Example 3: Preparation of Third Polyester Resin 3356.5 g (20.2 mol) of terephthalic acid, 1341.4 g (21.6 mol) of ethylene glycol, and 826.6 g (5.7 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, 0.016 g of Clarient's Polysynthren Blue RLS as a blue toner, 0.004 g of Clarient's Solvaperm Red BB as a red toner, 1 ppm of polyethylene as a crystallization agent, and 1000 ppm of Irganox 1076 as an antioxidant were used. Then, nitrogen was injected into the reactor to form a pressurized state in which the pressure of the reactor was higher than normal pressure by 0.5 kgf/cm² (absolute pressure: 1127.8 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 275° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g.

A content of a residue derived from isosorbide with respect to the total residue derived from a diol contained in the polyester resin was 14 mol %.

Preparation Example 4: Preparation of First Polyester Resin 4297.3 g (25.9 mol) of terephthalic acid, 1845.8 g (29.8 mol) of ethylene glycol, 189.0 g (1.3 mol) of isosorbide, and 186.4 g (1.3 mol) of 1,4-cyclohexanedimethanol were placed in a 10 L reactor to which a column, and a condenser capable of being cooled by water were connected, and 1.0 g of $GeO_2$ as a catalyst, 1.46 g of phosphoric acid as a stabilizer, 1.1 g of cobalt acetate as a coloring agent, and 1000 ppm of trimellitic anhydrate as a branching agent were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 250° C. over 2 hours. Thereafter, the temperature of the reactor was maintained at 250° C. until the mixture in the reactor became transparent with the naked eye. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 265° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g.

A content of a residue derived from isosorbide was 2 mol % and a content of a residue derived from 1,4-cyclohexanedimethanol was 5 mol % with respect to the total residue derived from a diol contained in the polyester resin.

Preparation Example 5: Preparation of Fourth Polyester Resin 3316.0 g (20.0 mol) of terephthalic acid, 1164.2 g (18.8 mol) of ethylene glycol, 87.5 g (0.6 mol) of isosorbide, and 230.1 g (1.6 mol) of 1,4-cyclohexanedimethanol were placed in a 10 L reactor to which a column, and a condenser capable of being cooled by water were connected, and 1.0 g of GeO₂ as a catalyst, 1.46 g of phosphoric acid as a stabilizer, and 0.8 g of cobalt acetate as a coloring agent were used. Then, nitrogen was injected into the reactor to form a pressurized state in which the pressure of the reactor was higher than normal pressure by 2.0 kgf/cm² (absolute pressure: 2231.1 mmHg).

Then, the temperature of the reactor was raised to 220° C. over 90 minutes, maintained at 220° C. for 2 hours, and then raised to 255° C. over 2 hours. Thereafter, the temperature of the reactor was maintained at 255° C. until the mixture in the reactor became transparent with the naked eye. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 285° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.55 dl/g.

A content of a residue derived from isosorbide was 2 mol % and a content of a residue derived from 1,4-cyclohexanedimethanol was 8 mol % with respect to the total residue derived from a diol contained in the polyester resin.

Preparation Example 6: Preparation of Third Polyester Resin 3124.0 g (18.8 mol) of terephthalic acid, 1330.2 g (21.5 mol) of ethylene glycol, 219.8 g (1.5 mol) of isosorbide, and 216.8 g (1.5 mol) of 1,4-cyclohexanedimethanol were placed in a 10 L reactor to which a column, and a condenser capable of being cooled by water were connected, and 1.0 g of GeO₂ as a catalyst, 1.46 g of phosphoric acid as a stabilizer, 1.0 g of cobalt acetate as a coloring agent and 1000 ppm of Irganox 1076 as an antioxidant were used. Then, nitrogen was injected into the reactor to form a pressurized state in which the pressure of the reactor was higher than normal pressure by 1.5 kgf/cm² (absolute pressure: 1863.3 mmHg).

Then, the temperature of the reactor was raised to 220° C. over 90 minutes, maintained at 220° C. for 2 hours, and then raised to 250° C. over 2 hours. Thereafter, an esterification reaction proceeded until the mixture in the reactor became transparent with the naked eye while maintaining the temperature of the reactor at 250° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 270° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g. When the intrinsic viscosity of the mixture in the reactor reached a desired level, the mixture was discharged out of the reactor and stranded. This was solidified with a cooling liquid and granulated to have an average weight of about 12 to 14 mg.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.75 dl/g.

A content of a residue derived from isosorbide was 4 mol % and a content of a residue derived from 1,4-cyclohexanedimethanol was 8 mol % with respect to the total residue derived from a diol contained in the polyester resin.

Preparation Example 7: Preparation of Fourth Polyester Resin 3371.0 g (20.3 mol) of terephthalic acid, 1435.3 g (23.2 mol) of ethylene glycol, 177.9 g (1.2 mol) of isosorbide, and 438.6 g (3.0 mol) of 1,4-cyclohexanedimethanol were placed in a 10 L reactor to which a column, and 1.0 g of $GeO_2$ as a catalyst, 1.46 g of phosphoric acid as a stabilizer, 0.013 g of Clarient's Polysynthren Blue RLS as a blue toner, and 0.004 g of Clarient's Solvaperm Red BB as a red toner were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 265° C. over 2 hours. Thereafter, an esterification reaction proceeded until the mixture in the reactor became transparent with the naked eye while maintaining the temperature of the reactor at 265° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 275° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.70 dl/g.

A content of a residue derived from isosorbide was 3 mol % and a content of a residue derived from 1,4-cyclohexanedimethanol was 15 mol % with respect to the total residue derived from a diol contained in the polyester resin.

Preparation Example 8: Preparation of Fourth Polyester Resin 3727.0 g (19.2 mol) of dimethyl terephthalate, 2620.5 g (42.3 mol) of ethylene glycol, and 841.5 g (5.8 mol) of isosorbide were placed in a 10 L reactor to which a column, and a condenser capable of being cooled by water were connected, and 1.5 g of Mn(II) acetate tetrahydrate and 1.8 g of $Sb_2O_3$ as a catalyst, and 0.7 g of cobalt acetate as a coloring agent were used. Then, nitrogen was injected into the reactor, but the pressure of the reactor was not increased (absolute pressure: 760 mmHg).

Then, the temperature of the reactor was raised to 220° C. over 90 minutes, maintained at 220° C. for 2 hours, and then raised to 240° C. over 2 hours. Thereafter, a transesterification reaction proceeded until the mixture in the reactor became transparent with the naked eye while maintaining the temperature of the reactor at 240° C. When the transesterification reaction was completed, the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 265° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.50 dl/g. When the intrinsic viscosity of the mixture in the reactor reached a desired level, the mixture was discharged out of the reactor and stranded. This was solidified with a cooling liquid and granulated to have an average weight of about 12 to 14 mg.

The particles were allowed to stand at 160° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.95 dl/g.

A content of a residue derived from isosorbide with respect to the total residue derived from a diol contained in the polyester resin was 10 mol %.

Preparation Example 9: Preparation of First Polyester Resin 3029.7 g (18.3 mol) of terephthalic acid, 159.5 g (0.96 mol) of isophthalic acid, 1334.1 g (21.5 mol) of ethylene glycol, and 504.9 g (3.5 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, and 0.7 g of cobalt acetate as a coloring agent were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.50 dl/g. When the intrinsic viscosity of the mixture in the reactor reached a desired level, the mixture was discharged out of the reactor and stranded. This was solidified with a cooling liquid and granulated to have an average weight of about 12 to 14 mg.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.95 dl/g.

A content of a residue derived from terephthalic acid was 95 mol % and a content of a residue derived from isophthalic acid was 5 mol % with respect to the total residue derived from an acid contained in the polyester resin, and a content of a residue derived from isosorbide with respect to the total residue derived from a diol was 10 mol %.

Comparative Preparation Example 1: Preparation of Third Polyester Resin 3000.5 g (18.1 mol) of terephthalic acid, 1064.6 g (17.2 mol) of ethylene glycol, and 1187.5 g (8.1 mol) of isosorbide were placed in a 10 L reactor to which a column, and a condenser capable of being cooled by water were connected, and 1.0 g of GeO$_2$ as a catalyst, 1.46 g of phosphoric acid as a stabilizer, 0.017 g of Clarient's Polysynthren Blue RLS as a blue toner, and 0.006 g of Clarient's Solvaperm Red BB as a red toner were used. Then, nitrogen was injected into the reactor to form a pressurized state in which the pressure of the reactor was higher than normal pressure by 0.5 kgf/cm$^2$ (absolute pressure: 1127.8 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 100 Torr (absolute pressure: 100 mmHg) over 10 minutes, and this pressure was maintained for 1 hour. Thereafter, the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g.

A content of a residue derived from isosorbide with respect to the total residue derived from a diol contained in the polyester resin was 25 mol %.

Comparative Preparation Example 2: Preparation of Third Polyester Resin 2518.5 g (15.2 mol) of terephthalic acid, 1044.1 g (16.8 mol) of ethylene glycol, 398.7 g (2.7 mol) of isosorbide and 240.3 g (1.7 mol) of 1,4-cyclohexanedimethanol were placed in a 10 L reactor to which a column, and a condenser capable of being cooled by water were connected, and 1.0 g of GeO$_2$ as a catalyst, 1.46 g of phosphoric acid as a stabilizer, 0.010 g of Clarient's Polysynthren Blue RLS as a blue toner, and 0.003 g of Clarient's Solvaperm Red BB as a red toner were used. Then, nitrogen was injected into the reactor to form a pressurized state in which the pressure of the reactor was higher than normal pressure by 1.5 kgf/cm$^2$ (absolute pressure: 1863.3 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 270° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.65 dl/g.

A content of a residue derived from isosorbide was 11 mol % and a content of a residue derived from 1,4-cyclohexanedimethanol was 11 mol % with respect to the total residue derived from a diol contained in the polyester resin.

Comparative Preparation Example 3: Preparation of Third Polyester Resin 3631.3 g (21.9 mol) of terephthalic acid, and 1763.1 g (28.4 mol) of ethylene glycol were placed in a 10 L reactor to which a column, and a condenser capable of being cooled by water were connected, and 1.0 g of GeO$_2$ as a catalyst, 1.5 g of phosphoric acid as a stabilizer, 0.7 g of cobalt acetate as a coloring agent and 1000 ppm of Irganox 1076 as an antioxidant were used. Then, nitrogen was injected into the reactor to form a pressurized state in which the pressure of the reactor was higher than normal pressure by 2.0 kgf/cm$^2$ (absolute pressure: 2231.1 mmHg).

Then, the temperature of the reactor was raised to 220° C. over 90 minutes, maintained at 220° C. for 2 hours, and then raised to 265° C. over 2 hours. Thereafter, an esterification reaction proceeded until the mixture in the reactor became transparent with the naked eye while maintaining the temperature of the reactor at 265° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 270° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g. When the intrinsic viscosity of the mixture in the reactor reached a desired level, the mixture was discharged out of the reactor and stranded. This was solidified with a cooling liquid and granulated to have an average weight of about 12 to 14 mg.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.75 dl/g.

A content of a residue derived from isosorbide was 0 mol % and a content of a residue derived from 1,4-cyclohexanedimethanol was 0 mol % with respect to the total residue derived from a diol contained in the polyester resin.

Comparative Preparation Example 4: Preparation of Third Polyester Resin 3328.2 g (20.0 mol) of terephthalic acid, 1479.2 g (23.9 mol) of ethylene glycol, and 175.6 g (1.2 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, 0.8 g of cobalt acetate as a coloring agent, and 1 ppm of polyethylene as a crystallization agent were used. Then, nitrogen was injected into the reactor to form a pressurized state in which the pressure of the reactor was higher than normal pressure by 1.5 kgf/cm² (absolute pressure: 1863.3 mmHg).

Then, the temperature of the reactor was raised to 220° C. over 90 minutes, maintained at 220° C. for 2 hours, and then raised to 270° C. over 2 hours. Thereafter, an esterification reaction proceeded until the mixture in the reactor became transparent with the naked eye while maintaining the temperature of the reactor at 270° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 275° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.65 dl/g.

A content of a residue derived from isosorbide with respect to the total residue derived from a diol contained in the polyester resin was 3 mol %.

Comparative Preparation Example 5: Preparation of Third Polyester Resin 3247.1 g (19.6 mol) of terephthalic acid, 1406.8 g (22.7 mol) of ethylene glycol, and 253.5 g (1.8 mol) of 1,4-cyclohexanedimethanol were placed in a 10 L reactor to which a column, and a condenser capable of being cooled by water were connected, and 1.0 g of $GeO_2$ as a catalyst, 1.46 g of phosphoric acid as a stabilizer, and 0.8 g of cobalt acetate as a coloring agent were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 260° C. over 2 hours. Thereafter, the temperature of the reactor was maintained at 260° C. until the mixture in the reactor became transparent with the naked eye. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.60 dl/g.

A content of a residue derived from 1,4-cyclohexanedimethanol with respect to the total residue derived from a diol contained in the polyester resin was 9 mol %.

Experimental Example 1: Evaluation of Physical Properties of Polyester Resin The physical properties of the polyester resins prepared in Preparation Examples 1 to 9 and Comparative Preparation Examples 1 to 5 were evaluated according to the methods described above, and the results are shown in Table 1.

In the polyester resins prepared in Preparation Examples 1 to 9 and Comparative Preparation Examples 1 to 5, the remaining residue derived from a diol except for the residue derived from isosorbide and the residue derived from 1,4-cyclohexanedimethanol is derived from ethylene glycol. The residue derived from ethylene glycol may include a residue derived from diethylene glycol introduced by reacting two ethylene glycols to form diethylene glycol, and reacting the diethylene glycol with a dicarboxylic acid or a derivative thereof.

TABLE 1

| | Residue derived from ISB (mol %) | Residue derived from CHDM (mol %) | Melting temperature after crystallization (° C.) | Haze (%) | Crystallization half-time (min) | Mn |
|---|---|---|---|---|---|---|
| Prep. Ex. 1 | 5 | 0 | 240 | 2 | 10 | 24,000 |
| Prep. Ex. 2 | 10 | 0 | 235 | 3 | 55 | 38,000 |
| Prep. Ex. 3 | 14 | 0 | 220 | 4 | 90 | 16,000 |
| Prep. Ex. 4 | 2 | 5 | 235 | 2 | 15 | 20,000 |
| Prep. Ex. 5 | 2 | 8 | 230 | 3 | 35 | 18,000 |
| Prep. Ex. 6 | 4 | 8 | 230 | 3.5 | 50 | 32,000 |
| Prep. Ex. 7 | 3 | 15 | 220 | 4 | 75 | 21,000 |
| Prep. Ex. 8 | 10 | 0 | 235 | 3 | 55 | 39,500 |
| Prep. Ex. 9 | 10 | 0 | 235 | 3 | 55 | 38,500 |
| Comp. Prep. Ex. 1 | 25 | 0 | NA [1] | 15 | >100 | 17,000 |
| Comp. Prep. Ex. 2 | 11 | 11 | NA [1] | 20 | >100 | 23,000 |
| Comp. Prep. Ex. 3 | 0 | 0 | 250 | 15 | 1 | 28,000 |
| Comp. Prep. Ex. 4 | 3 | 0 | 247 | 3 | 1 | 26,000 |
| Comp. Prep. Ex. 5 | 0 | 9 | NA [1] | 2 | >100 | 27,000 |

[1] The polyester resins of Comparative Preparation Examples 1, 2 and 5 were amorphous resins and were not crystallized, so that the melting temperature after crystallization could not be measured.

Examples and Comparative Examples: Preparation of Polyester Resin Blend

The polyester resin prepared in one of Preparation Examples 1 to 9 and Comparative Preparation Examples 1 to 5 was blended with recycled PET in a weight ratio of 50:50. Specifically, recycled PET, which was re-pelletized by melt-extruding flakes obtained by pulverizing and washing waste plastics, was dry-mixed at roam temperature with the above polyester resin pelletized separately, and dried at a temperature of 150° C. to prepare a polyester resin blend.

The composition of the recycled PET may vary depending on where the waste plastics are collected, how to sort the waste plastics, and how to re-pelletize it. The recycled PET used in this experiment is a copolymer of terephthalic acid, isophthalic acid and ethylene glycol, which contains isophthalic acid within 3 mol % with respect to the total dicarboxylic acid, and has an intrinsic viscosity (IV) of 0.75 dl/g, a crystallization temperature of 130° C., and a melting temperature of 250° C.

Experimental Example 2: Evaluation of Physical Properties of Polyester Resin Blend The physical properties of the polyester resin blends prepared above were evaluated according to the methods described above, and the results are shown in Table 2.

TABLE 2

| | Haze (%) | 2nd melting temperature (° C.) | Occurrence of flow-mark | Occurrence of flake fusion during recycling | Loss modulus onset point (° C.) |
|---|---|---|---|---|---|
| Ex. 1 | 3 | 245 | X | X | 135 |
| Ex. 2 | 1 | 240 | X | X | 150 |
| Ex. 3 | 1 | 225 | X | X | ND [2] |

TABLE 2-continued

| | Haze (%) | 2nd melting temperature (° C.) | Occurrence of flow-mark | Occurrence of flake fusion during recycling | Loss modulus onset point (° C.) |
|---|---|---|---|---|---|
| Ex. 4 | 2 | 235 | X | X | 140 |
| Ex. 5 | 1 | 235 | X | X | 145 |
| Ex. 6 | 2 | 230 | X | X | ND [2] |
| Ex. 7 | 2.5 | 225 | X | X | ND [2] |
| Ex. 8 | 2 | 245 | X | X | 145 |
| Ex. 9 | 3 | 245 | X | X | ND [2] |
| Comp. Ex. 1 | 2 | 210 | ○ | ○ | ND [2] |
| Comp. Ex. 2 | 3 | 220 | X | ○ | 135 |
| Comp. Ex. 3 | 98 | 255 | X | X | 100 |
| Comp. Ex. 4 | 98 | 250 | X | X | 110 |
| Comp. Ex. 5 | 50 | 255 | X | X | 100 |

[2] When loss modulus onset point was not observed, it was indicated as ND.

Referring to Table 2, it was confirmed that Examples 1 to 9 used a polyester resin containing 5 to 20 mol % of a diol moiety derived from a comonomer including isosorbide with respect to the total diol moiety, and thus could provide a polyester resin composition having a low haze and a melting temperature advantageous for processing by blending with recycled PET. Particularly, it was confirmed that the polyester resin blends of Examples 1 to 9 had a high loss modulus onset point, so that the polyester resin according to an embodiment of the present disclosure can effectively slow down the crystallization rate of the recycled PET, making it possible to manufacture a thick container with high transparency.

In addition, no flow-mark was observed on the bottles in which the polyester resin compositions of Examples 1 to 9 were processed, and the bottles were not fused even if they were left at a high temperature after pulverization, so that they can be reused as the resin blend.

On the other hand, in the case of Comparative Example 3 using a homopolymer made of terephthalic acid and ethylene glycol as a polyester resin and Comparative Example 4 using a polyester resin containing less than 5 mol % of a diol moiety derived from a comonomer including isosorbide, miscibility with recycled PET was excellent, but the crystallization rate of the recycled PET could not be lowered, resulting in a very high haze.

In addition, Comparative Example 1 using a polyester resin containing more than 20 mol % of a diol moiety derived from a comonomer including isosorbide had poor miscibility with recycled PET, resulting in flow-marks on the bottle prepared therefrom. Further, the flakes obtained by pulverizing the bottle were fused at a high temperature, and could not be reused.

In addition, Comparative Example 2 using a polyester resin containing more than 20 mol % of a diol moiety derived from a comonomer including isosorbide and 1,4-cyclohexanedimethanol had poor miscibility with recycled PET, resulting in flow-marks on the bottle prepared therefrom.

In the case of Comparative Example 5 using a polyester resin containing a diol moiety derived from a comonomer other than isosorbide had excellent miscibility with recycled PET, but the crystallization rate of the recycled PET could not be lowered and the haze was very high.

The invention claimed is:

1. A polyester resin blend comprising polyethylene terephthalate; and a polyester resin having a structure in which an acid moiety derived from a dicarboxylic acid or a derivative thereof and a diol moiety derived from a diol are repeated by polymerizing a dicarboxylic acid or a derivative thereof and a diol containing ethylene glycol and a comonomer, wherein the polyester resin comprises 14 to 20 mol % of a diol moiety derived from a comonomer with respect to the total diol moiety derived from a diol, and the comonomer comprises isosorbide, wherein the polyester resin comprises 3 to 15 mol % of a diol moiety derived from isosorbide with respect to the total diol moiety derived from a diol, and wherein the polyester resin has a crystallization half-time of 75 minutes to 90 minutes.

2. The polyester resin blend of claim 1, wherein the polyethylene terephthalate comprises recycled polyethylene terephthalate.

3. The polyester resin blend of claim 2, wherein the recycled polyethylene terephthalate has an intrinsic viscosity of 0.6 to 0.8 dl/g at 35° C.

4. The polyester resin blend of claim 2, wherein the recycled polyethylene terephthalate comprises 95 mol % or more of a residue derived from terephthalic acid with respect to the total acid moiety derived from dicarboxylic acid or the derivative thereof and 95 mol % or more of a residue derived from ethylene glycol with respect to the total diol moiety derived from a diol.

5. The polyester resin blend of claim 1, wherein the polyester resin is a crystalline resin.

6. The polyester resin blend of claim 1, wherein a passing rate is 97 wt % or more, when the polyethylene terephthalate and the polyester resin are pelletized to be 80 pieces per 1 g each, dried at a temperature of 160° C. for 1 hour, and then passed through a sieve having a sieve size of 2.36 mm.

7. The polyester resin blend of claim 1, wherein the polyester resin has a haze of 5% or less, when measured for a 6 mm thick specimen according to ASTM D1003-97.

8. The polyester resin blend of claim 1, wherein the polyester resin has a melting temperature of 210 to 245° C., when measured after crystallization at 180° C. for 100 minutes.

9. The polyester resin blend of claim 1, wherein the polyester resin comprises 3 to 10 mol % of the diol moiety derived from isosorbide with respect to the total diol moiety derived from a diol.

10. The polyester resin blend of claim 1, wherein the comonomer further comprises cyclohexanedimethanol.

11. The polyester resin blend of claim 10, wherein the polyester resin comprises a residue derived from isosorbide and a residue derived from cyclohexanedimethanol in a ratio of 1:2 to 5 mol.

12. The polyester resin blend of claim 1, wherein the polyester resin blend has a melting temperature of 225 to 250° C.

13. The polyester resin blend of claim 1, wherein the polyester resin blend has a haze of 2.5% or less, when measured for a 6 mm thick specimen according to ASTM D1003-97.

* * * * *